United States Patent [19]

LeBlanc et al.

[11] 4,298,469
[45] Nov. 3, 1981

[54] MANIFOLDING SYSTEM FOR OIL PURIFIERS

[76] Inventors: Ralph W. LeBlanc; Robert M. Bingham, both of P.O. Box 52734, New Orleans, La. 70152

[21] Appl. No.: 167,778

[22] Filed: Jul. 14, 1980

[51] Int. Cl.³ .......................................... B01D 25/30
[52] U.S. Cl. .................................. 210/168; 210/180; 210/238; 210/249; 210/341
[58] Field of Search ............... 210/167, 168, 180, 184, 210/185, 186, 249, 253, 340, 341, 232, 238

[56] References Cited

U.S. PATENT DOCUMENTS

| | | | |
|---|---|---|---|
| 487,467 | 12/1892 | Beyrle | 210/340 |
| 767,808 | 8/1904 | Forbes | 210/249 |
| 2,411,539 | 11/1946 | Gunn | 210/340 |
| 2,489,362 | 11/1949 | Bastrup | 210/249 |
| 2,633,991 | 4/1953 | Beatly | 210/249 |
| 3,067,880 | 12/1962 | Bowers | 210/249 |
| 3,564,863 | 2/1971 | Sasselli | 210/168 |
| 3,598,243 | 8/1971 | Gutkowski | 210/340 |
| 3,945,923 | 3/1976 | Rogers | 210/253 |
| 4,146,475 | 3/1979 | Forsland | 210/180 |
| 4,192,750 | 3/1980 | Elfes | 210/253 |

FOREIGN PATENT DOCUMENTS 1151969 5/1969 United Kingdom ............... 210/253

Primary Examiner—Ernest G. Therkorn
Attorney, Agent, or Firm—Fishburn, Gold & Litman

[57] ABSTRACT

Multiple standardized oil purifiers or refiners are ganged together to provide for suitable contamination removal from oil utilized in an engine or the like. The refiners are mounted on a manifold which functions as a single unit in conjunction with the refiners. The manifold includes an inlet chamber connecting the oil from the engine with the refiners and an outlet chamber connecting the refined oil after passing through the refiners with the engine. Preferably only a single conduit connects each of the inlet and outlet chambers with the engine. The manifold also functions as a supporting device for the refiners.

5 Claims, 9 Drawing Figures

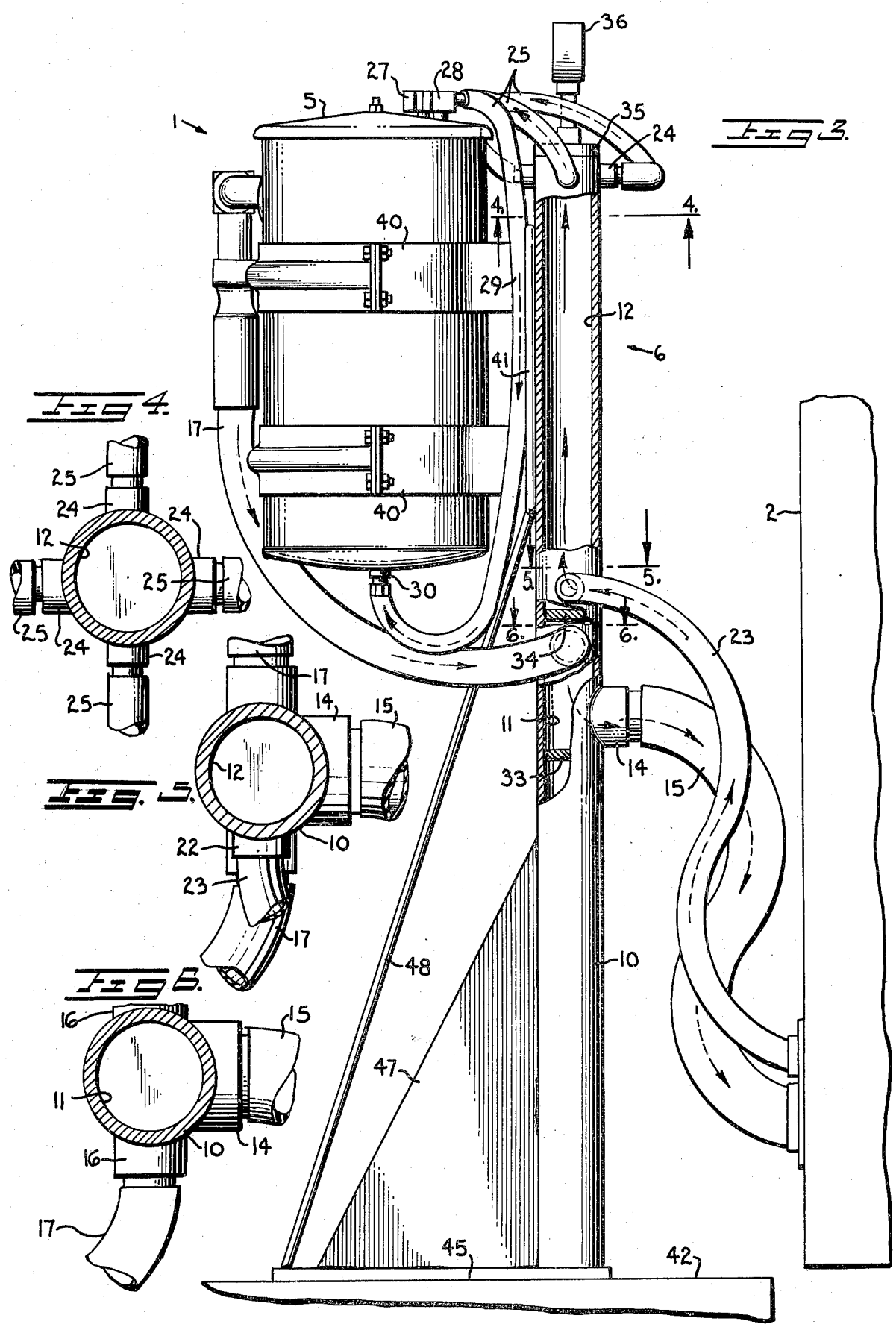

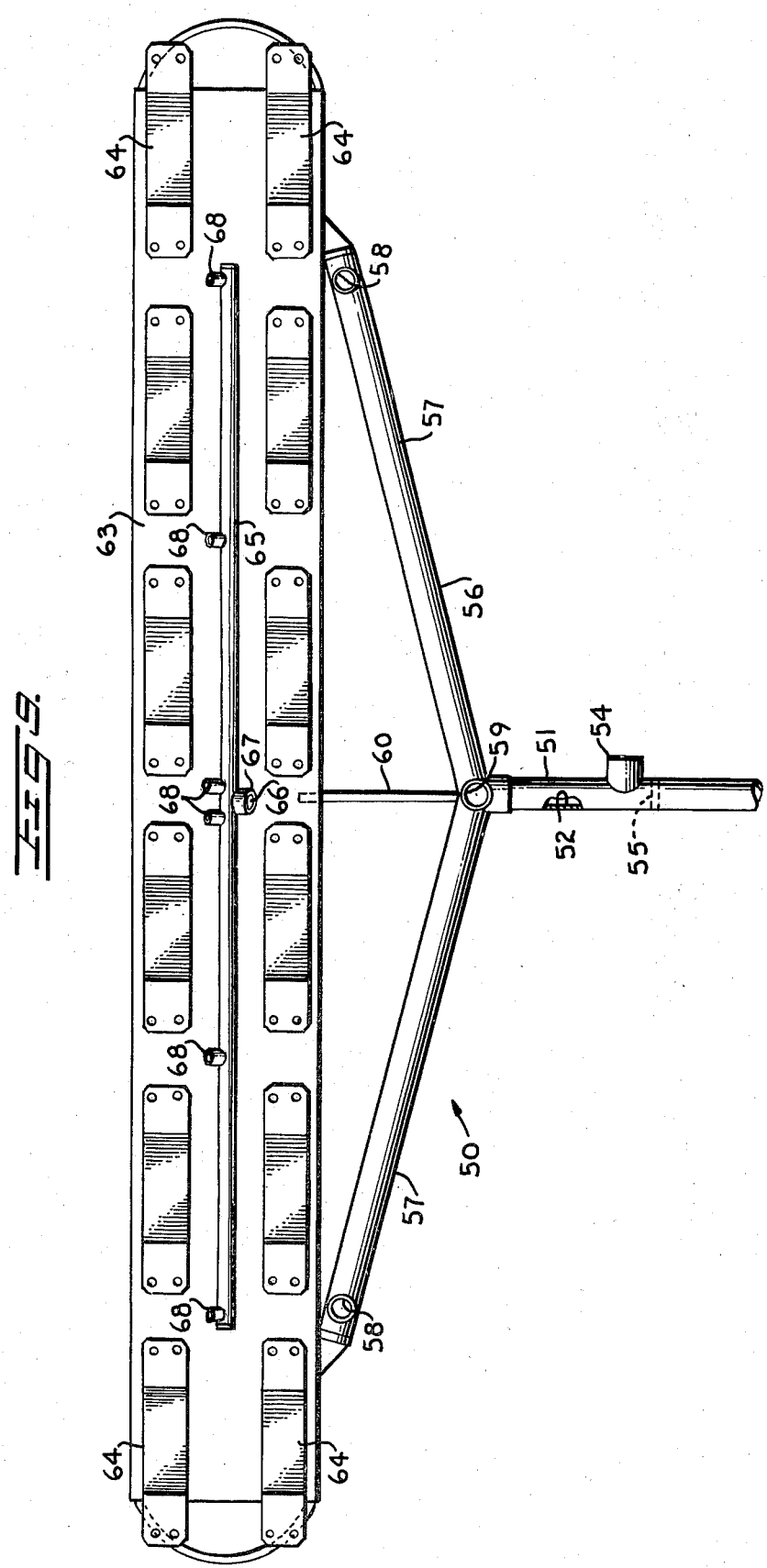

![4,298,469]

MANIFOLDING SYSTEM FOR OIL PURIFIERS

BACKGROUND OF THE INVENTION

The present invention is related to a manifold for oil purifiers or refiners and, in particular, to a system wherein multiple refiners are interconnected by means of the manifold to form a single unit and wherein the manifold also forms a support structure for the refiners.

Oil refiners are used to remove particulate, liquid, volatile, and other contaminants from oil after the oil has been used by the various type engines and, in particular, large engines of the type used on ocean going vessels or heavy operating equipment. Conventional refiners are often of variable sizes so as to be compatible with various sized engines or various oil flows associated with such engines. Unfortunately, it is costly to manufacture and stock oil refiners having a wide range of sizes. It has also been found that as the size of oil refiner increases, it becomes increasingly and disproportionately labor intensive to provide service to the larger refiners. In fact, the larger refiners often require additional service crew members to change filter media associated with the refiner or provide other service thereto. It has also been found that, as a refiner increases in size, there is a much greater likelihood that damage will occur to seals associated with the refiner during servicing or that the refiner will be improperly reassembled after servicing.

Therefore, according to the present invention, a refiner having only a single uniform size is preferably provided for use with essentially any engine or oil flow. This refiner is ganged to provide suitable contaminant removal from oil flows too large for a single refiner to handle. For example, the single oil refiner may be designed to handle an oil flow from an engine having a 25 gallon oil capacity under average operating conditions. Thus, an engine having a capacity of 100 gallons of oil is provided with 4 such refiners ganged together. Of course the single refiner is viable for removing contaminants from oil in any engine having a capacity less than 25 gallons of oil.

The above discussed ganging of oil refiners has been found to function best when the refiners are grouped together such that they may be installed as a single unit. For this purpose a manifold has been provided which links the various inlet and outlets of the refiners together respectively such that a single conduit may connect each of the flows to and from the engine to all of the refiners. In addition it has been found that the manifold may also function as a supporting mechanism for the refiners. In particular, the supporting mechanism comprises a tubular support member having chambered portions which chambered portions function as a manifold for distributing to and collecting oil from the refiners. Preferably the support member is a self-standing structure such that the entire unit may be easily and quickly positioned and secured as a whole at the site of an engine requiring oil refining by relatively simple connection of the inlet and outlet conduits to the engine. Cost of such multiple units is relatively low since they may be mass produced without changes in the production line for various sizes. Spare storage costs are also less since one size fits all and the refiners are relatively simple and require relatively little labor to change out or service. In addition, if one refiner is damaged, cost of replacement thereof is relatively inexpensive compared to a single large unit.

OBJECTS OF THE INVENTION

Therefore the objects of the present invention are: to provide a relatively uniform oil purifier or refiner adapted for ganging so as to be compatible to various oil flows originating from engines of substantially varying sizes; to provide a common manifold for such refiners when ganged together so that the refiners can be flow connected to an engine as a unit; to provide such a manifold which also functions to support the refiners; to provide such a supporting manifold which comprises a tubular member having chambered portions therein through which chambered portions associated oil inlets and outlets of the refiners are respectively flow connected to the engine; to provide such a refiner which is relatively inexpensive to manufacture; to provide such a refiner which reduces storage costs by reducing the volume of refiners required to be stored as spare parts; to provide such a refiner which is relatively easy to service or replace; to provide a unit comprising the supporting manifold and refiners which is relatively easy to connect to an engine to be serviced thereby and which is shippable as a unit to reduce loss of parts; to provide such a unit which is easily adaptable to various numbers of refiners; to provide a method wherein oil is passed through ganged refiners of a uniform size in order to remove contaminants therefrom; and to provide such a unit which is relatively economical to manufacture, which is efficient in use, and which is particularly well adapted for the proposed usage thereof.

The multiple refiners tend to function as backups for one another since when one is damaged, occluded, or otherwise rendered into a nonusable or non-functioning state, the remaining refiners will still provide some cleaning of contaminants from the oil until the non-functioning unit can be made operable.

Other objects and advantages of this invention will become apparent in the following description taken in connection with the accompanying drawings wherein are set forth by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is side elevational view of a portion of the engine and the apparatus with various portions broken away to show detail thereof.

FIG. 4 is cross-sectional view of the supporting manifold taken along line 4—4 of FIG. 3.

FIG. 5 is a cross-sectional view of the supporting manifold taken along line 5—5 of FIG. 3.

FIG. 6 is a cross-sectional view of the supporting manifold taken along line 6—6 of FIG. 3.

FIG. 9 is a front elevational view of a modified supporting manifold.

DETAILED DESCRIPTION OF THE PREFERRED EMBODIMENT

Figure 1:
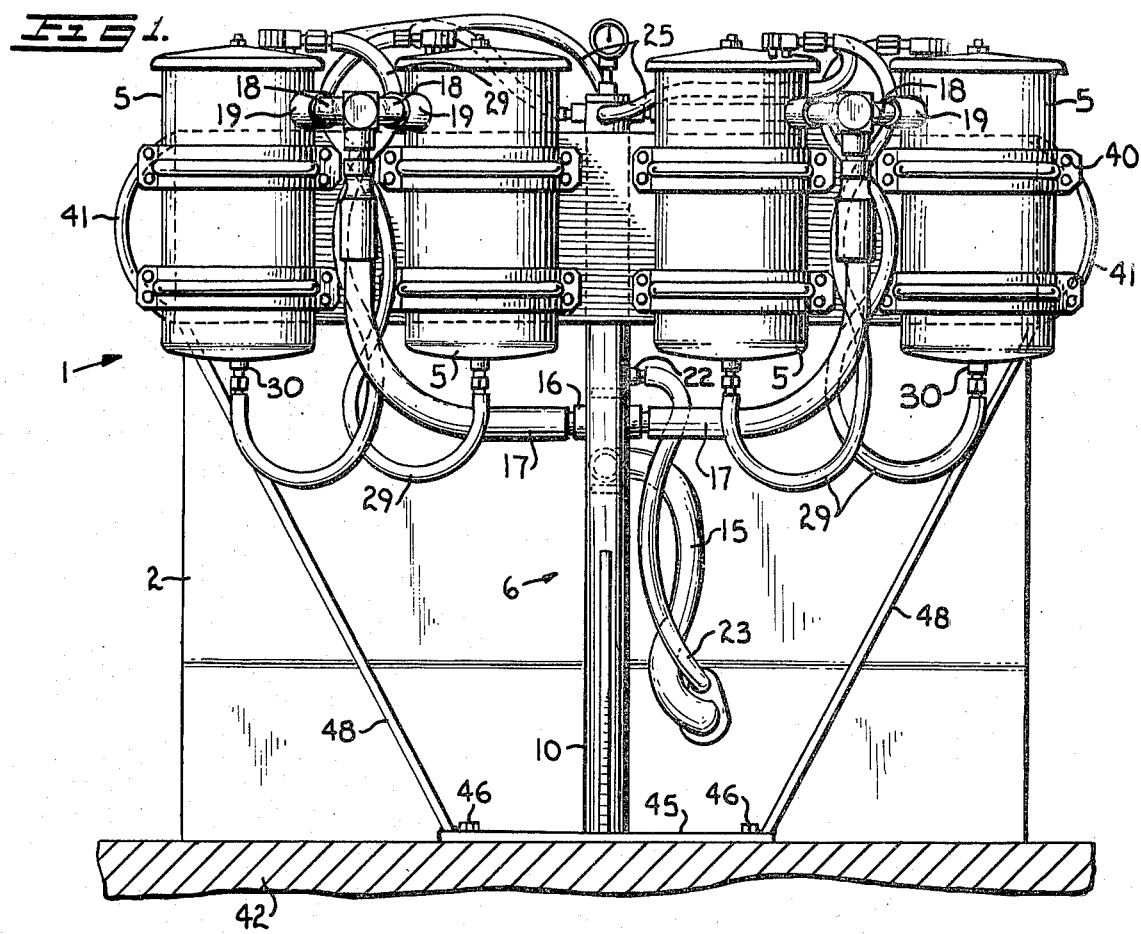
FIG. 1 is a front elevational view of an apparatus including a plurality oil refiners and a supporting manifold therefor according to the present invention connected to an engine.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a device, system, or apparatus which is a first embodiment according to the present invention for removing contaminant material from lubricating oil utilized by an oil source, machine, or engine 2. The apparatus 1 comprises a plurality of refiners, purifiers, rectifiers or the like and a manifold having a first flow chamber for receiving contaminated oil from an engine 2, first connecting means for flow interconnecting the first flow chamber with each of the refiners, a second flow chamber for receiving refined oil from the refiners and flow communicating with the engine and second connecting means for flowing interconnecting each of the refiners with the second flow chamber. Preferably the apparatus 1, as illustrated in the embodiment of FIGS. 1 through 8, comprises a plurality of ganged oil refiners 5 and a supporting mainfold 6.

Figure 2:
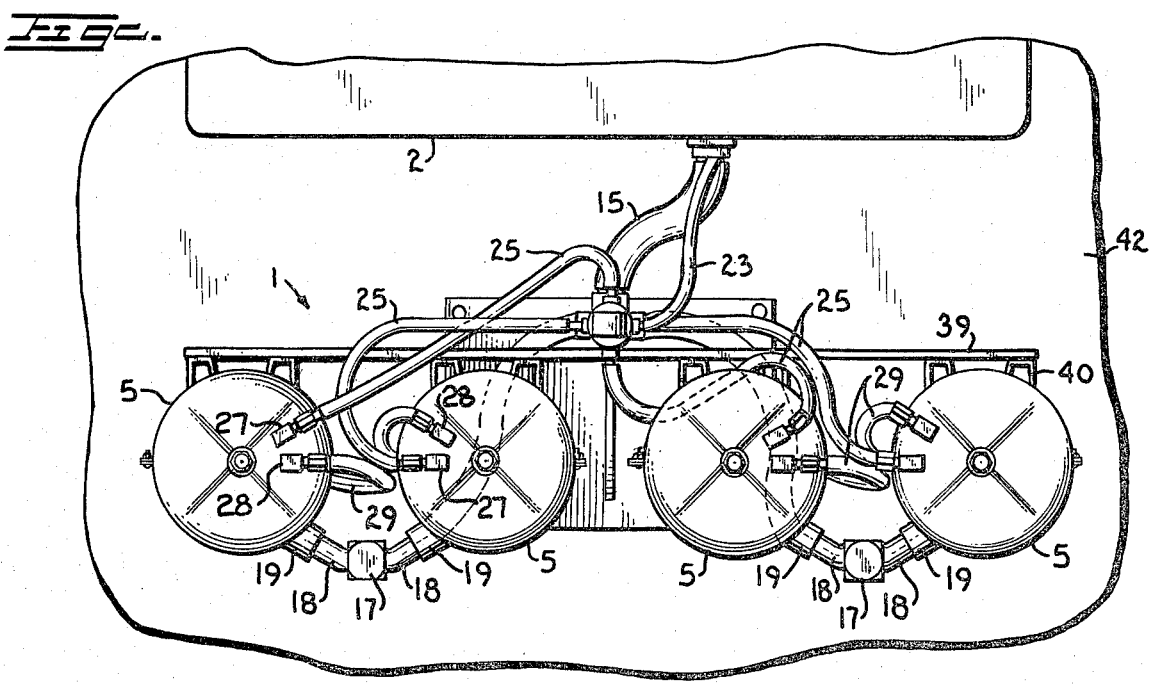
FIG. 2 is a top plan view of the apparatus and a portion of the engine.
Figure 7:
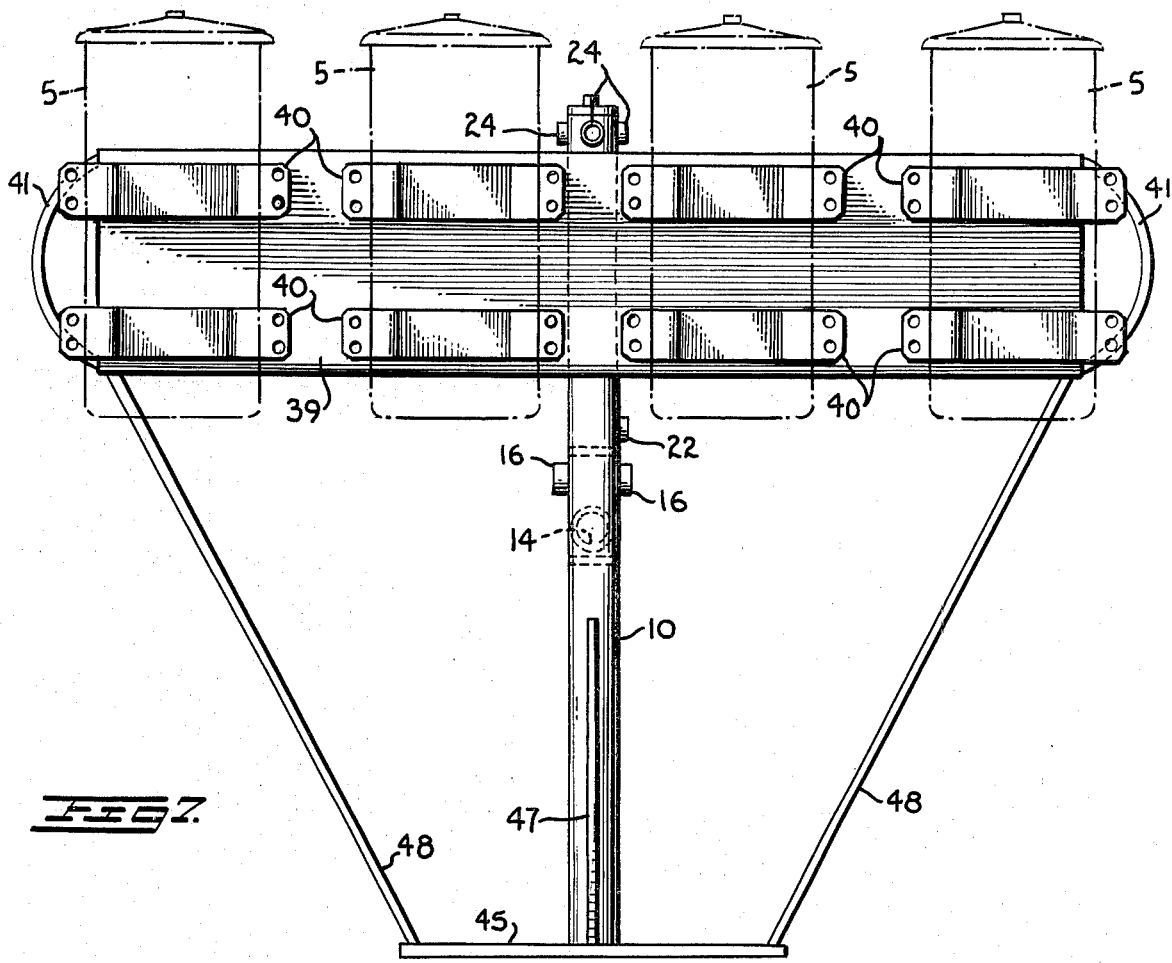
FIG. 7 is a front elevational view of the supporting manifold showing the refiners in phantom.
Figure 8:
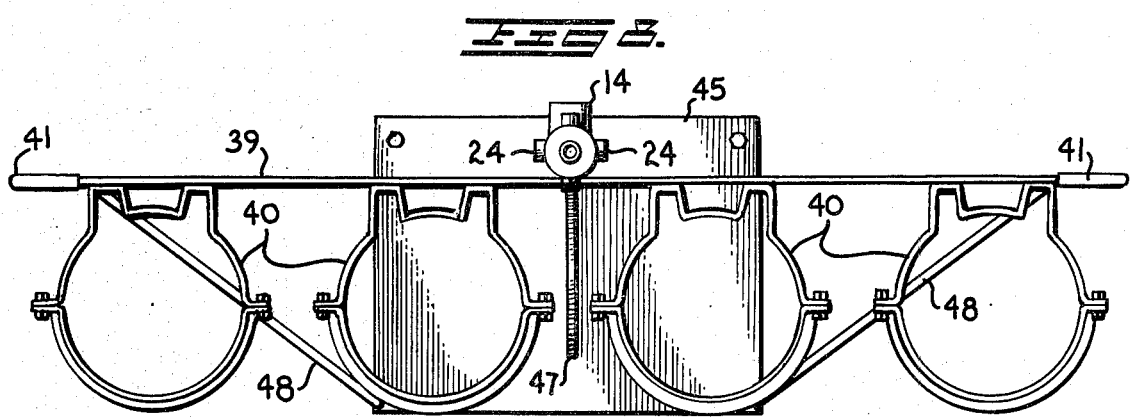
FIG. 8 is a top plan view of the supporting manifold.

Th engine 2 may be any device utilizing lubricating oil and may especially be such devices as are utilized for powering ocean-going and river vessels or heavy construction equipment. The refiners 5 are preferably substantially identical and uniform in size. Although the refiners 5 may be any suitable device for removing contaminants, especially particulate and volatile contaminants, from oil, a suitable refiner for such purposes is disclosed in the present inventors' co-pending allowed application entitled APPARATUS FOR REMOVING CONTAMINANTS FROM LUBRICATING OIL, Ser. No. 169,893. The particular refiners 5 illustrated in FIG. 1, 2, and 3 are designed to include a head cavity (not shown) through which the oil is first circulated from the engine 2 such that the cavity is heated thereby, after which the oil enters the bottom of the refiner 5, passes therethrough, and exits near the top of each refiner 5 such that the oil flows by gravity back to the engine 2 through conduits will be described hereinafter.

The supporting manifold 6, as illustrated in FIGS. 1 through 8 comprises an upright or vertically oriented tubular member 10 having first and second chambers which are illustrated as an inlet or lower chambered portion 11 and an inlet or upper chambered portion 12 respectively. The lower chambered portion 11 has an externally opening nozzle 14 sealably flow connecting with a hose or conduit 15 which interconnects with a refined oil storage reservoir (not shown) associated with the engine 2. The lower chambered portion 11 also includes a pair of externally opening nozzles 16 which each flow interconnect with connecting means such as the illustrated hose or conduit 17 associated therewith. Each conduit 17 at an upper end thereof divides by means of suitable piping into a pair of conduits 18 which each flow interconnect with a nozzle 19 on the sides of an associated pair of the refiners 5 respectively. In this manner oil flowing from each of the refiners 5 at the nozzles 19 respectively is allowed to flow by means of the force of gravity in sequence through the conduit 17, through the lower chambered portion 11 wherein oil is collected, and through the conduit 15 to the engine 2. It is noted that arrows represent flow of oil through the apparatus 1, as illustrated in FIG. 3.

A lower nozzle 22 also opens externally of the upper chambered portion 12 near a lower end thereof and flow communicates with one end of a hose or conduit 23. An opposite end of the conduit 23 is connected to the engine 2 such that oil to be refined is supplied under pressure thereto. The upper chambered portion 12 also has 4 nozzles 24 radially opening externally of the chambered portion 12 at an end thereof. Each of the nozzles 24 is flow connected to one end of connecting means such as the illustrated hose or conduit 25 so as to flow communicate therewith. An opposite end of each of the conduits 25 flow communicates with a connector 27 positioned near the top of each refiner 5 respectively. A second connector 28 associated with each refiner 5 communicates with a bypass hose 29 which in turn is connected to a third connector 30 near the bottom of each refiner 5 respectively. In this manner oil to be refined flows from the engine 2 through the conduit 23, through the upper chambered portion 12, through the various conduits 25 in parallel, through the upper portion of each refiner 5, through the hoses 29, and thereafter into the lower portion of each of the refiners 5 respectively.

The lower chamber portion 11 is defined by the interior of the tubular member 10 and by upper and lower stops or plugs 33 and 34 respectively sealably mounted within the interior of the tube 10. The upper chambered portion 12 is defined by the interior portion of the tubular member 10 between the plug 34 and an upper cap 35 which is sealably mounted on the upper end of the tubular member 10. A pressure gage 36 is mounted on the cap 35 so as to give an indication of the oil pressure within the upper chamber portion 12. Preferably the plugs 33 and 34 are positioned relatively close to the nozzles 14 and 22 respectively such that the oil is not stagnant therebetween and such that sedimentation does not collect in this location.

The supporting manifold 6 includes a means to support each of the refiners 5 such as the illustrated plate 39 extending laterally of the tubular member 10. The plate 39 is preferrably postioned to make servicing of the refiners 5 relatively easy and at least sufficiently high that the outlet nozzles 19 on each of the refiners 5 are positioned above the engine 2 oil reservoir (not shown) such that gravity is effective in urging the oil from the refiners 5 to the engine 2. Each of the refiners 5 is secured to the plate 39 by a pair of encircling brackets 40. The plate 39 is attached to the tubular member 10 by welding or the like and the brackets 40 are attached to the plate 39 by screws, bolts, welding or the like. A semi-circular ring 41 extends outwardly from opposite ends of the plate 39, so as to protect the refiners 5 and to function as a handle to assist in, movement of the apparatus 1.

Although it is foreseen that the supporting manifold 6 may be secured to an upright or vertical wall by welding, bolting, or the like, it is preferrable that the apparatus 1 be self-standing, as is illustrated in the embodiment shown in FIG. 3. Thus, the supporting manifold 6 of the present embodiment, the tubular member 10 extends sufficiently below the plug 33 to substantially intercept the floor or ground structure 42 of the environment wherein the apparatus 1 is utilized. In particular the bottom of the tubular member is attached to a base plate 45 which is horizontally aligned and is secured to the floor structure 42 by bolts 46 or the like. A triangular brace 47 is secured to both the base plate 45 and the tubular member 10. A pair of stabilizing rods 48 extend upwardly from opposite sides of the base plate 45 and diverge so as to intersect outward ends of the plate 39 and support the latter.

Preferably the apparatus 1 functions in a unitized manner. In this way the apparatus 1 may be taken to a site location as a unit with the only installation required being that of connecting the conduits 15 and 23 to engine 2 and securing the base plate 45 to the floor structure 42.

In use with regard to the embodiment shown in FIGS. 1 through 8 oil to be refined flows from the engine through a single conduit 23 into the apparatus 1 wherein the oil is distributed to the various refiners 5 and collected in such a manner that the oil is conducted back in a refined state to the engine 2 by the conduit 15. In addition the supporting manifold 6 serves a dual purpose of supporting and stabilizing the refiners 5 while also distributing the oil 2 and collecting the oil from various refiners 5. If oil flow requirements increase or decrease and/or if severity of the engine use increases, the entire apparatus 1 may be removed and replaced by more suitable apparatus containing more or fewer refiners 5 as the case may require. The individual refiners 5 may be replaced by unlocking the brackets 40 associated therewith and disconnecting the appropriate hoses 17 and 25 associated therewith and thereafter inserting a new refiner 5 and reversing the process. Each refiner 5 may be serviced, such as to change filter media therein or the like, by simply stopping oil flow therethrough and dismantling the refiner 5 as necessary.

FIG. 9 illustrates a second modified embodiment of a supporting manifold 50 according to the present invention. The supporting manifold 50 comprises a tubular member 51 having a chamber 52 therein. The chamber 52 is defined by the interior of the tubular member 51 above a plug 55. A nipple 54 is positioned at a lower end of the chamber 52 so as to open externally thereof. A Y-shaped type structure 56 defines an upper end of the chamber 52. The structure 56 includes outwardly extending arms 57 having externally opening nipples 58 at outer ends thereof and a centrally located nipple 59 therebetween. The nipple 54 is adapted for attachment to a conduit returning refined oil from the apparatus 50 to an engine (not shown) and the nipples 58 and 59 are adapted to be connected to conduits for collective refined oil through diverging channels from as many as six or more oil refiners (not shown). A stabilizing rod 60 extends outwardly from the tubular member 51 and is secured to a support plate 63 which extends laterally of the tubular member 51. Opposite ends of the structure 56 are also secured to the support plate 63. A plurality of brackets 64 suitable for securely holding oil refiners (not shown) are attached to the support plate 63. And an elongate conduit 65 is also secured to the support plate 63. The conduit 65 includes an internal channel or chamber 66 and has an externally opening nipple 67 adapted for connecting to a hose or the like for attachment to engine so as to supply oil to be refined therefrom to the conduit 65. A plurality of nipples 68 open externally of the chamber 66 and are adapted for attaching to a hose or the like so as to deliver oil to be refined to refiners (not shown).

In use the supporting manifold 50 functions essentially as the supporting manifold 6 with the exception the chamber 66 is not located within the tubular member 51 nor are the chambers 52 and 66 adjacent as in the previous embodiment. The embodiment of FIG. 9 is also particularly adapted for supplying oil to and conducting oil from six refiners and may easily be adapted for four, eight, ten or more refiners.

Therefore according to the present invention a method is disclosed of refining oil including the steps of conducting the oil having contaminants therein from a user of such oil, directing the oil through a common manifold to a plurality of uniform refiners, flowing to the oil through the refiners such that contaminants are removed therefrom, directing the oil from the refiners through a second common manifold, and conducting the oil from the second common manifold back to the user. Preferrably oil passes through the refiners in parallel, that is the oil is divided into substantially equivalent flow streams, each stream then flowing through a separate refiner.

It is to be understood that while certain embodiments of the present invention have been described and shown herein, it is not to be limited to the specific forms or arrangement of parts herein described and shown.

What is claimed and desired to secure by Letters Patent is as follows:

1. An apparatus for use with a plurality of oil refiners and contaminated oil from an oil utilizing source; said apparatus comprising:
   (a) a supporting manifold adapted for supplying contaminated oil to and removing uncontaminated oil from the refiners and being independent therefrom;
   (b) said supporting manifold including:
      (1) a first flow chamber for receiving the contaminated oil;
      (2) first connecting means for flow interconnecting said first flow chamber with each of the refiners;
      (3) a second flow chamber adapted for flow communicating with the engine for transferring refined oil thereto after the refined oil has passed through the refiner; and
      (4) second connecting means for flow interconnecting each of the refiners with said second flow chamber; and
   (c) securing means for connecting each of the refiners to said manifold system; and wherein:
   (d) said manifold comprises a tubular member being intermediately partitioned normal to an axis thereof so as to define first and second chambered portions therein; said first and second chambered portions comprising said first chamber and said second chamber respectively; and wherein
   (e) each of said first and second chambered portions are adapted to be interconnected with the oil utilizing source by a single conduit respectively.

2. The apparatus according to claim 1 including:
   (a) support means for fixedly supporting said apparatus relative to the oil utilizing source.

3. The apparatus according to claim 2 wherein:
   (a) said support means comprises a support structure such that said apparatus is unitary and essentially free-standing.

4. The apparatus according to claim 1 wherein:
   (a) said first connecting means and said second connecting means are each comprised of a plurality of conduits connecting each of said first and second chambered portions with the refiners respectively, such that oil flows through each of the refiners generally equally and uniformly in a parallel manner.

5. The apparatus according to claim 4 wherein:
(a) said supporting manifold includes a plate extending laterally from said tubular structure; and including
(b) attachment means for securing each of the refiners to the support plate.

* * * * *